United States Patent
Highfill

(10) Patent No.: US 6,684,550 B2
(45) Date of Patent: Feb. 3, 2004

(54) MOUNTING SYSTEM FOR CLAY TARGET THROWER AND RIFLE/PISTOL REST

(76) Inventor: Stephen D. Highfill, Rte. 4, Box 669, California Hot Springs, CA (US) 93207

( * ) Notice: Subject to any disclaimer, the term of this patent is extended or adjusted under 35 U.S.C. 154(b) by 0 days.

(21) Appl. No.: 09/847,825

(22) Filed: May 1, 2001

(65) Prior Publication Data

US 2002/0194766 A1 Dec. 26, 2002

(51) Int. Cl.$^7$ .......................... F41A 23/00; F41A 27/00; F41B 3/04
(52) U.S. Cl. .............................. 42/94; 124/8
(58) Field of Search .............. 124/8; D22/113; 42/94

(56) References Cited

U.S. PATENT DOCUMENTS

| | | | |
|---|---|---|---|
| 3,910,249 A | * 10/1975 | Gustavsson | 124/8 |
| 3,949,728 A | * 4/1976 | Gustafsson | 124/8 |
| D247,365 S | * 2/1978 | Rowlands et al. | D22/113 |
| 4,576,395 A | * 3/1986 | Longoria | 280/511 |
| 4,867,356 A | * 9/1989 | Melby | 224/520 |
| 5,451,088 A | * 9/1995 | Broad | 296/26.08 |
| 5,489,110 A | * 2/1996 | Van Dusen | 280/415.1 |
| 5,775,560 A | * 7/1998 | Zahn et al. | 224/524 |
| 5,933,999 A | * 8/1999 | McClure et al. | 42/94 |
| 6,173,705 B1 | * 1/2001 | DeWitt | 124/1 |
| 6,269,578 B1 | * 8/2001 | Callegari | 42/94 |

* cited by examiner

Primary Examiner—Charles T. Jordan
Assistant Examiner—John W. Zerr
(74) Attorney, Agent, or Firm—Kenneth J. Hovet

(57) ABSTRACT

A mounting system for clay target thrower and rifle/pistol rest (10) having a hollow extender (12) which has an elongated square extender male member (12A) having an extender male member opening (12AA) therethrough. An extender horizontal member (12B) is securely fastened at a front distal end to a rear distal end of the extender male member (12A). An extender vertical member (12C) is securely fastened at a bottom distal end to a rear distal end of the extender horizontal member (12B). A mounting system for clay target thrower and rifle/pistol rest (10) having a holder (14) removably insertable into the extender (12). The holder (14) comprises a holder platform (14A) securely attached to a top distal end of a holder upper member (14B) which is attached at a lower distal end to a top distal end of a holder lower member (14C) having a holder ring (14D) therebetween. The holder platform (14A) comprises at least one holder platform opening (14AA) therethrough.

6 Claims, 5 Drawing Sheets

MOUNTING SYSTEM FOR CLAY TARGET THROWER AND RIFLE/PISTOL REST

BACKGROUND OF THE INVENTION

1. Field of the Invention

The present invention relates to a mounting system for clay target thrower and rifle/pistol rest. More particularly, the present invention relates to a mounting system for clay target thrower and rifle/pistol rest capable of attaching different devices thereto.

2. Description of the Prior Art

Numerous innovations for a mounting system for clay target thrower and rifle/pistol rest are present in the prior art that are adapted to be used. Even though these innovations may be suitable for the specific individual purposes to which they address, they would not be suitable for the purposes of the present invention as heretofore described.

The aforementioned devices come in varying sizes, configuration and constructive materials.

One prior art device named, "Dew-itt", is made by DeWitt Co. Of Jackson, Calif. The device is similar to this apparatus but it attaches to a 2×2 receiver of a pickup truck and allows the operator to be seated while throwing targets. It only permits a 15° up or down and 20° right or left movement where the present invention allows 75° to 180°, respectively. In addition, the Dew-itt device does not permit mounting of several brands of throwing machines whereas the present invention is universal.

Prior art trailer hitch systems are utilized for campers, trailers, and other towing devices but the prior art does not include trailer hitch systems that have attachments such as skeet/trap throwers, rifle or pistol rests, bicycle racks, ski racks, snowboard racks, surfboard racks, luggage holders, and storage containers.

SUMMARY OF THE INVENTION

The present invention is primarily an apparatus for clay target throwing machines. It makes operating a wide variety of throwing machines much faster, easier and safer than ever before. Mounted to the receiver hitch of any vehicle, it allows targets to be thrown rearward in a 180° arc. In addition to the horizontal control, the apparatus with attachments permits 75° of vertical control for certain brands of throwers not having this feature already built in. The device is preferably manufactured from 2 inch diameter steel pipe which makes the unit, light, strong, and durable.

The types of problems encountered in the prior art are clay target throwers are usually mounted on a tire rim for stability and are not versatile.

In the prior art, unsuccessful attempts to solve this problem were attempted namely: different ground mounted stabilizing holders. However, the problem was solved by the present invention because it is light, easy to install and durable.

Innovations within the prior art are rapidly being exploited in the field of recreational sports.

The present invention went contrary to the teaching of the art that describes and claims ground mounted throwing device mounts.

The present invention solved a long felt need for a trailer attachable throwing device mount.

The present invention produced unexpected results namely: the clay targets were able to travel farther upon throwing due to greater stability of the system.

Accordingly, it is an object of the present invention to provide a mounting system for clay target thrower and rifle/pistol rest having an extender, holder, trap holder, and trap thrower.

More particularly, it is an object of the present invention to provide the extender having an extender male member, extender horizontal member, extender vertical member, and extender fastener.

In keeping with these objects, and with others which will become apparent hereinafter, one feature of the present invention resides, briefly stated, in the extender male member having an extender male member opening.

When the extender vertical member is designed in accordance with the present invention, it has an extender vertical member opening.

In accordance with another feature of the present invention, the holder has a holder platform, holder upper member, holder lower member, and holder ring.

Another feature of the present invention is that the holder platform has a holder platform opening.

Yet another feature of the present invention is that the holder upper member has a holder upper member slot.

Still another feature of the present invention is that the holder lower member has a holder lower member opening.

Yet still another feature of the present invention is that the trap holder has a trap holder plate, trap holder extender, and trap holder fastener.

Still yet another feature of the present invention is that the trap holder plate has a trap holder plate opening.

Another feature of the present invention is that the trap holder extender has a trap holder extender slot and a trap holder extender opening.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

10—mounting system for clay target thrower and rifle/pistol rest (10)
12—extender (12)
12A—extender male member (12A)
12AA—extender male member opening (12AA)
12B—extender horizontal member (12B)
12C—extender vertical member (12C)
12CA—extender vertical member opening (12CA)
12D—extender fastener (12D)
14—holder (14)
14A—holder platform (14A)
14AA—holder platform opening (14AA)
14B—holder upper member (14B)
14BA—holder upper member slot (14BA)
14C—holder lower member (14C)
14CA—holder lower member opening (14CA)
14D—holder ring (14D)
16—trap holder (16)
16A—trap holder plate (16A)
16AA—trap holder plate opening (16AA)
16B—trap holder extender (16B)
16BA—trap holder extender slot (16BA)

16BB—trap holder extender opening (16BB)
16C—trap holder fastener (16C)
18—trap thrower (18)

DESCRIPTION OF THE PREFERRED EMBODIMENT

Figure 1:
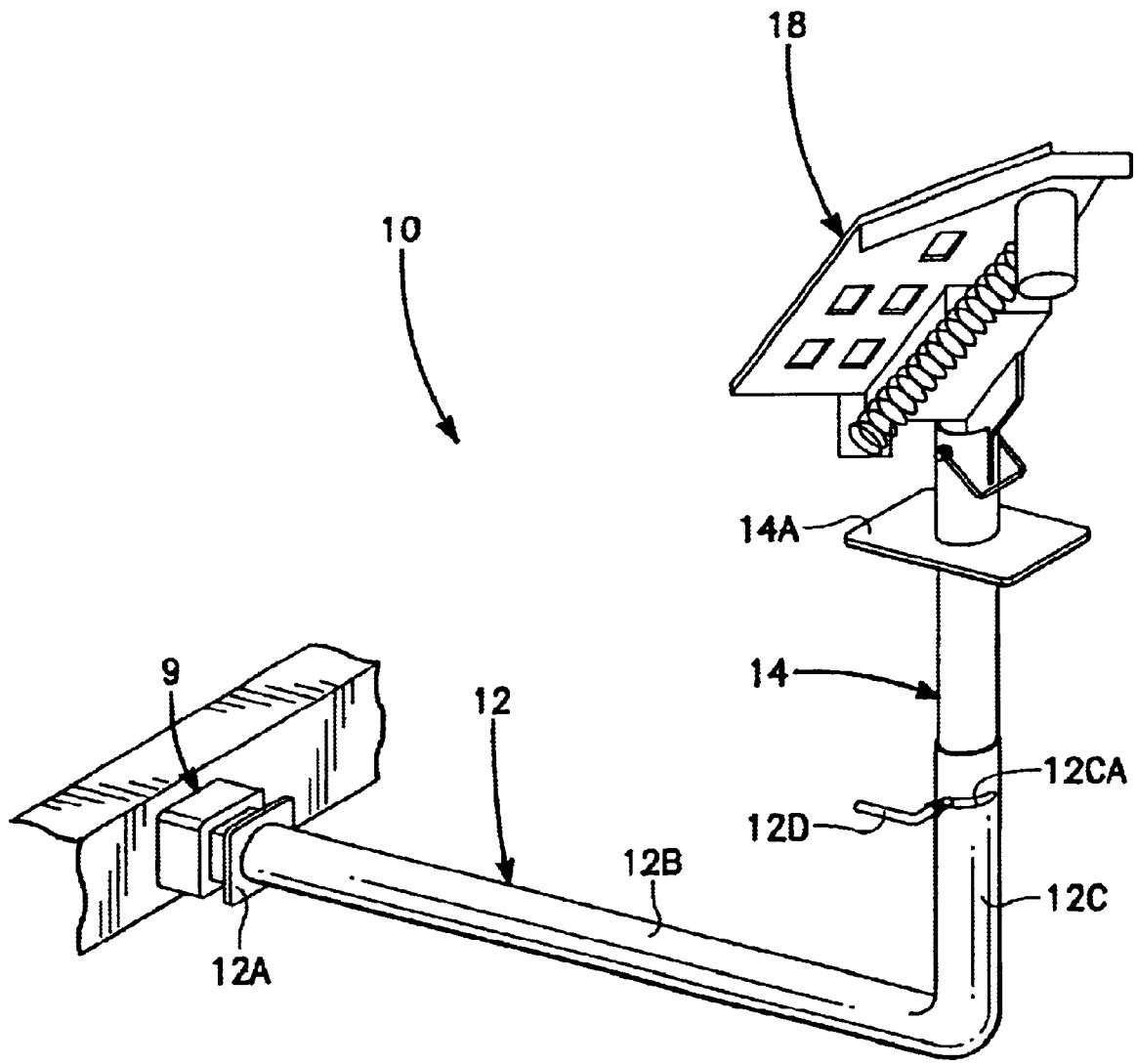
FIG. 1 is a right-top perspective view of a mounting system for clay target thrower and rifle/pistol rest (10) attached to a vehicle trailer hitch.
Figure 5:
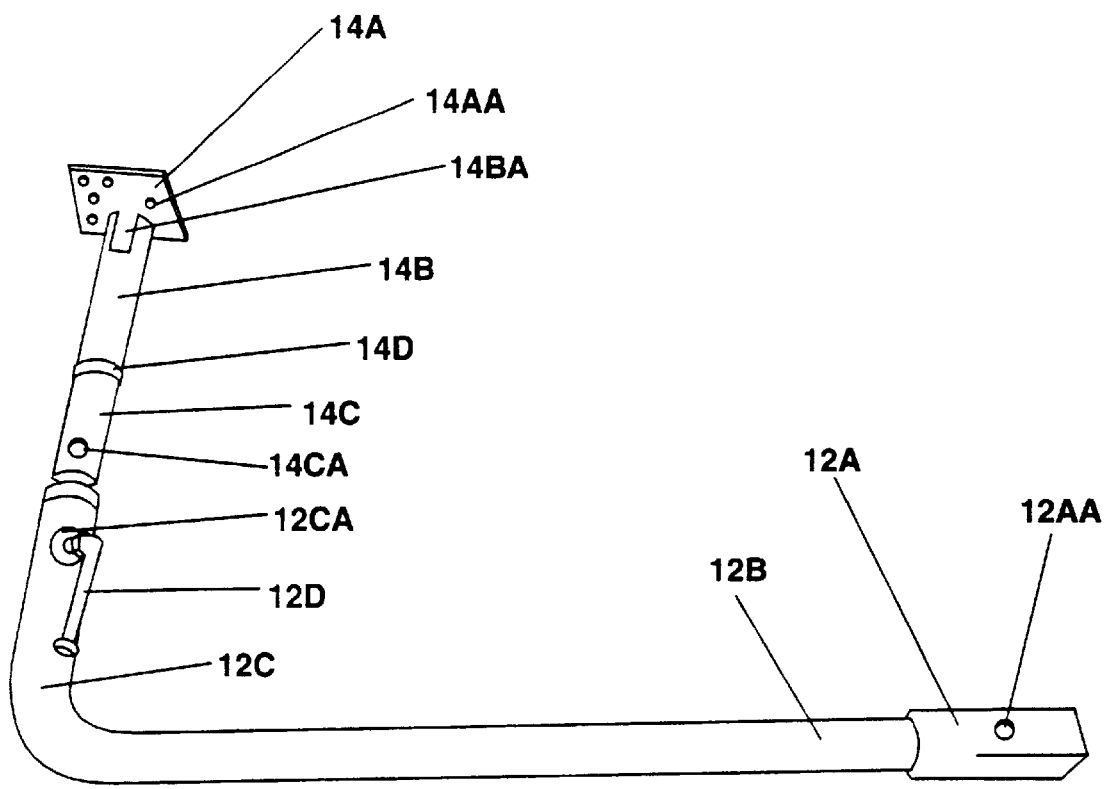
FIG. 5 is a side view mounting system for clay target thrower and rifle/pistol rest (10).

Referring to FIG. 1 and FIG. 5 which are a right-top perspective view of a mounting system for clay target thrower and rifle/pistol rest (10) attached to a vehicle trailer hitch 9 and a side view mounting system for clay target thrower and rifle/pistol rest (10), respectively. The mounting system for clay target thrower and rifle/pistol rest (10) comprises a hollow extender (12) which comprises an elongated square extender male member (12A) having an extender male member opening (12AA) therethrough. An extender horizontal member (12B) is securely fastened at a front distal end to a rear distal end of the extender male member (12A). An extender vertical member (12C) is securely fastened at a bottom distal end to a rear distal end of the extender horizontal member (12B). The extender vertical member (12C) comprises an extender vertical member opening (12CA) therethrough and the holder lower member (14C) comprises at least one holder lower member opening (14CA) therethrough. The extender vertical member opening (12CA) is preferably a slot allowing for rotation of the holder (14) within the extender vertical member (12C). An extender fastener (12D) is positioned through the extender vertical member opening (12CA) and the at least one holder lower member opening (14CA) securely connecting the extender vertical member (12C) to the holder lower member (14C).

The extender horizontal member (12B) is manufactured from 2 inch O.D. pipe that has a wall thickness of 0.0125 inches. It extends 36 inches from the end of the hitch and curves upward, forming an elbow. Three inches from the top of the elbow, there is an extender vertical member opening (12CA) which is preferably a slot ½ inch high going half way around the pipe. The extender fastener (12D) is made of ½ inch diameter steel 6 inches long, turned to make the use of a wrench unnecessary when loosening or tightening. The extender fastener (12D) passes through the extender vertical member opening (12CA) and screws into the nut that is welded behind the holder lower member opening (14CA) in the holder lower member (14C). Loosening the extender fastener (12D) allows the thrower to be quickly turned right or left up to 180°. Tightening the extender fastener (12D) causes the thrower to freeze in position and allows the operator to cock the thrower.

Figure 2:
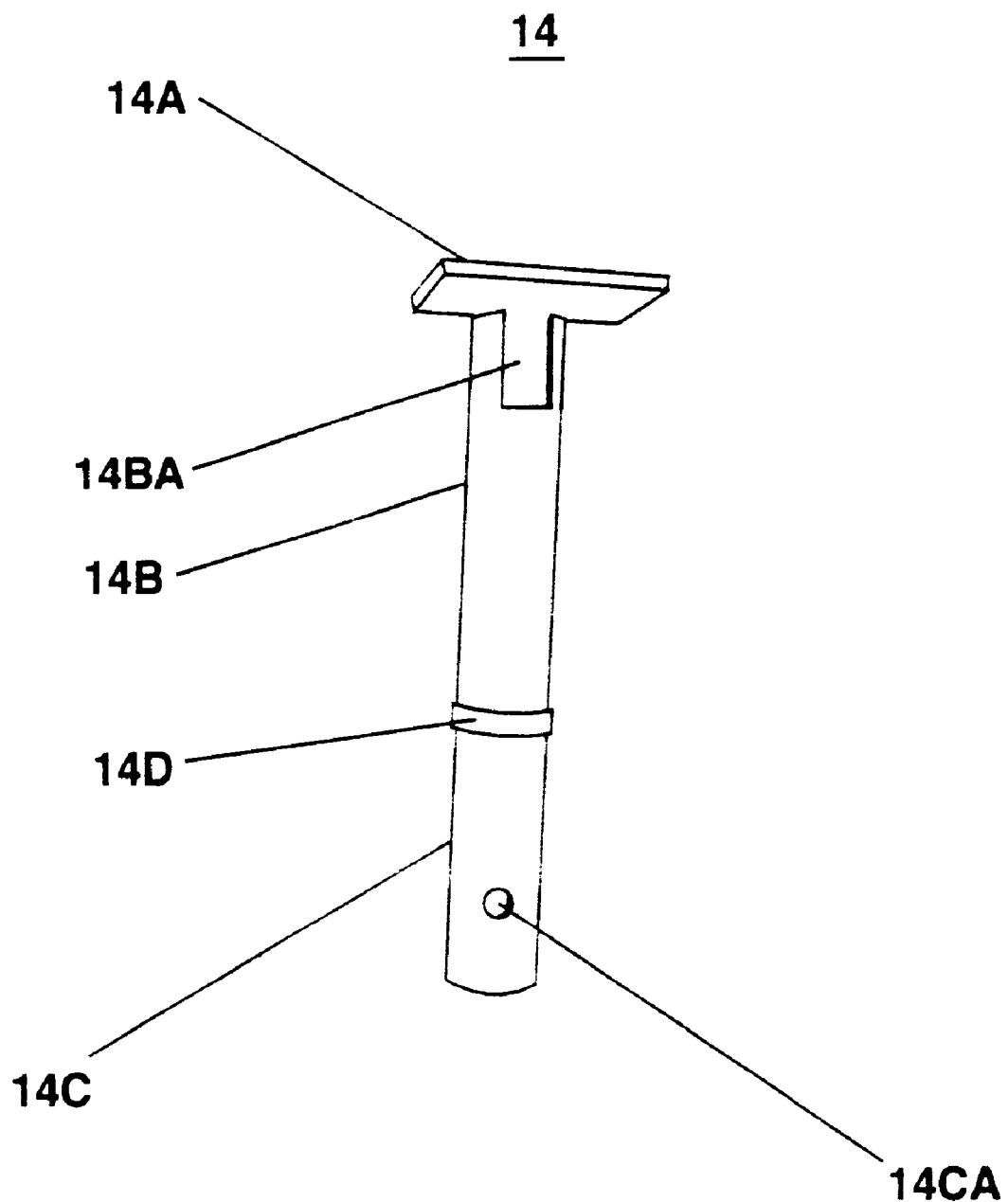
FIG. 2 is a side view of a holder (14).

Referring to FIG. 2 which is a side view of a holder (14). The mounting system for clay target thrower and rifle/pistol rest (10) comprises a holder (14) removably insertable into the extender (12). The holder (14) comprises a holder platform (14A) securely attached to a top distal end of a holder upper member (14B) which is attached at a lower distal end to a top distal end of a holder lower member (14C) having a holder ring (14D) therebetween. The holder platform (14A) comprises at least one holder platform opening (14AA) therethrough. The holder upper member (14B) further comprises a holder upper member slot (14BA) therein. The holder upper member slot (14BA) allows for vertical rotation. The holder platform (14A) is one-quarter inch plate steel, 4"×7", drilled with ⅜ inch and ½ inch holes which are the holder platform openings (14AA) to accommodate the bolt pattern of most machines. The holder platform (14A) is welded to a 1.75 inch O.D. holder upper member (14B) (wall thickness 0.085") which is 11 inches long and acts as a neck. Three inches from the lower end of the holder upper member (14B), centered on the back side, there is a ½ inch diameter hole with a ½ inch nut welded to the interior wall of the holder upper member (14B). Three inches above the opening, there is a holder ring (14D) that is spot welded to the neck so that when the neck is inserted into extender vertical member (12C), the bolt hole is aligned with the extender vertical member opening (12CA).

Figure 3:
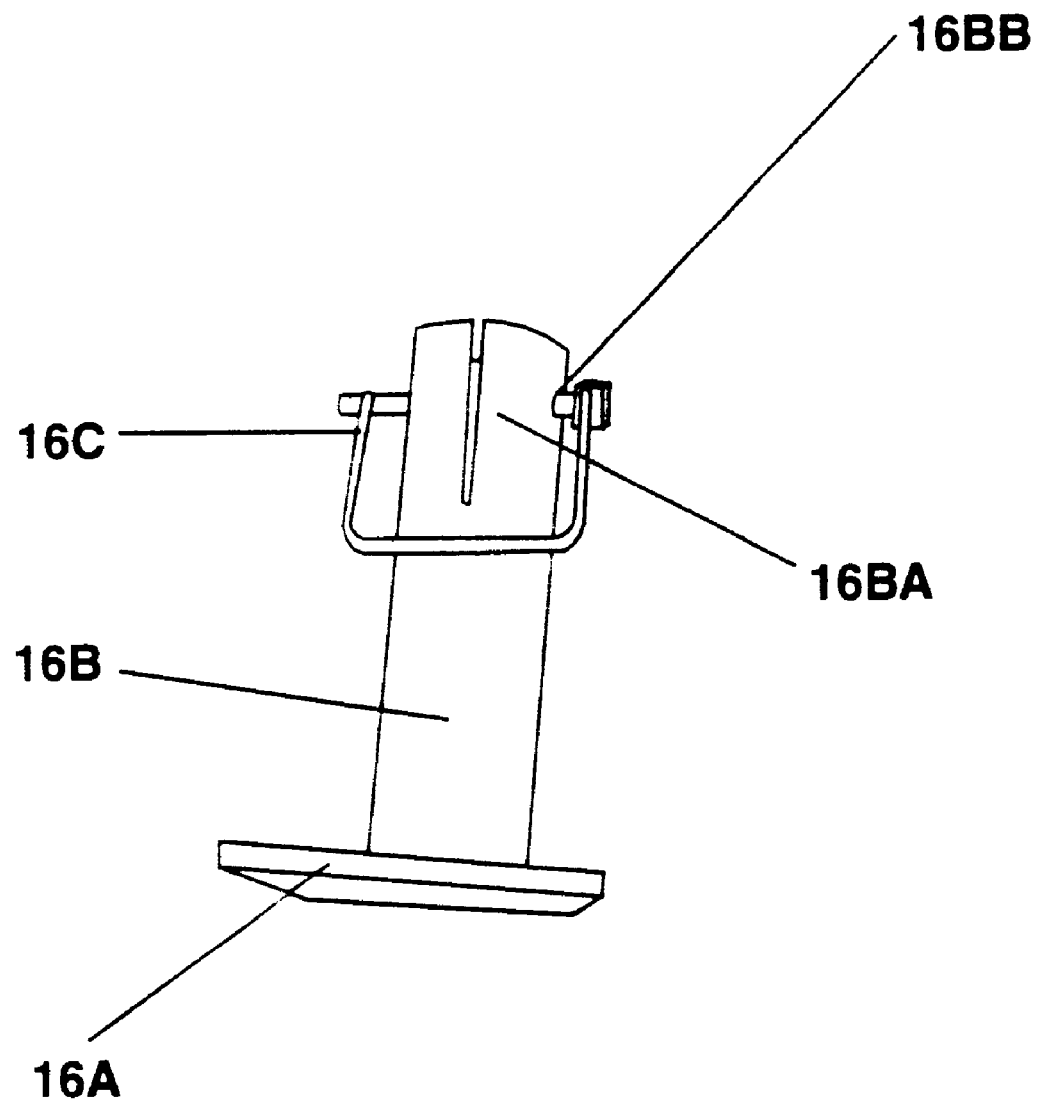
FIG. 3 is a side view of a trap holder (6).
Figure 4:
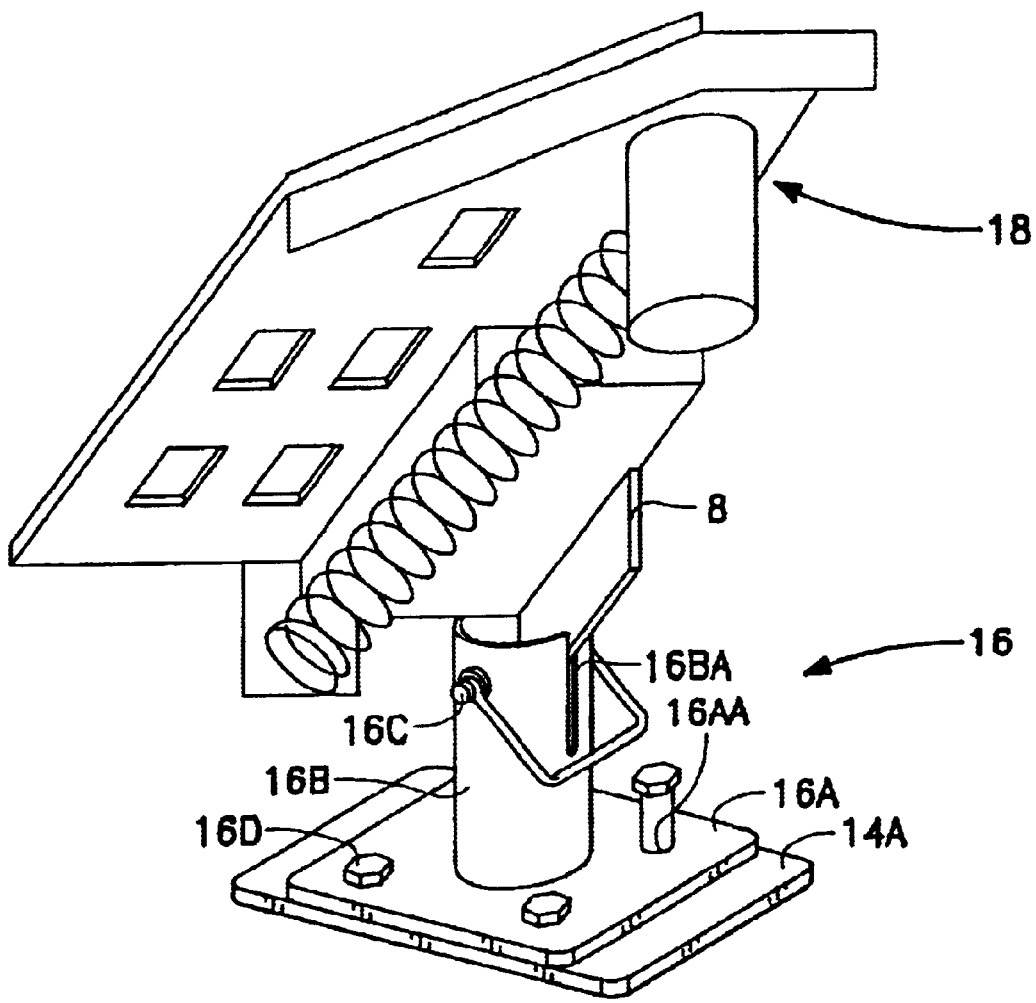
FIG. 4 is a side view of a trap holder (16).

Now referring to FIG. 3 and FIG. 4 which are side views of a trap holder (16) which comprises a trap holder plate (16A) having at least one trap holder plate opening (16AA) in a complimentary position to the at least one holder platform opening (14AA). A trap holder bolt (16D) is positioned through the at least one trap holder plate opening (16AA) and the at least one holder platform opening (14AA). The trap holder (16) further comprises a trap holder extender (16B) attached at a bottom distal end to a top surface of the trap holder plate (16A). The trap holder extender (16B) comprises a trap holder extender opening (16BB) therethrough. The trap holder extender (16B) is removably connected to a trap thrower (18) by a trap holder fastener (16C). The trap holder (16) is universally made to accommodate different trap throwers (18) that are mounted on horizontal frames. The trap holder pivot plate 8 fits in the ⅛×2 inch trap holder extender slot 16BA and is secured there by means of a pin. The trap thrower (18) may be aimed up or down by moving the trap holder fastener (16C). The trap holder extender (16B) is welded to the 4×4 inch trap holder plate (16A) of ¼ inch steel. This trap holder plate (16A) has four ⅜ bolt holes for mounting a special unit on the trap holder plate (16A).

It will be understood that each of the elements described above, or two or more together, may also find a useful application in other types of constructions differing from the type described above.

Some advantages and uses are shown attached as Appendix A While the invention has been illustrated and described as embodied in a mounting system for clay target thrower and rifle/pistol rest, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A mounting system for a clay target thrower comprising:
   A) a hollow extender (12) comprising:
      i) an elongated square extender male member (12A) configured to couple to a trailer hitch;
      ii) an extender horizontal member (12B) securely fastened at a front distal end to a rear distal end of the extender male member (12A); and iii) an extender vertical member (12C) having a slot that forms a 180-degree arc around the circumference of the extender vertical member, wherein the extender vertical member is securely fastened at a bottom distal end to a rear distal end of the extender horizontal member (12B);

B) a holder (14) comprising a neck having a lower distal end that is removably insertable into the extender vertical member (12C), and a holder platform (14A) securely attached to a top distal end of the neck, wherein the lower distal end of the neck is rotatable when inserted within the extender vertical member, a portion of the neck configured to extend into the extender vertical member having an opening for securably receiving a member screwed into the opening in the neck; and C) an extender fastener configured to be inserted through the slot in the extender vertical member and further configured to screw into the opening in the neck when the opening in the neck is aligned with the slot, wherein the extender vertical member is configured to freeze a rotation of the neck of the holder within the extender vertical member when the extender fastener is tightened.

2. The mounting system for a clay target thrower according to claim 1 wherein a size of the slot determines a range of possible rotation of the neck within the extender vertical member within which range the neck can still be securely fastened by tightening the extender fastener.

3. The mounting system for a clay target thrower as described in claim 1, wherein the neck further comprises a holder upper slot (14BA) therein.

4. The mounting system for a clay target thrower as described in claim 1 further comprising a ring coupled to the neck and positioned such that, when the neck is inserted into the extender vertical member, the ring will stop the insertion at a point wherein the opening in the neck is aligned with the slot in the extender vertical member.

5. A method of controlling a direction of flight of a clay projectile fired from a mount coupled to a trailer hitch, the mount comprising a hollow vertical member with a slot extending across an arc of the hollow vertical member, and a holder comprising a neck inserted within the hollow vertical member, the holder further comprising a platform fixed to the neck, wherein the neck comprises an opening and wherein a fastener extends through the slot of the hollow vertical member and through the opening within the neck, the method comprising the steps of:

a) loosening the fastener;

b) rotating the neck within the hollow vertical member; and c) tightening the fastener.

6. The method according to claim 5 wherein the step of rotating the neck is performed until the fastener is pressed against an end of the slot, thereby limiting further rotation of the neck within the hollow vertical member.

* * * * *